US010812714B2

United States Patent
Ayalasomayajula et al.

(10) Patent No.: US 10,812,714 B2
(45) Date of Patent: *Oct. 20, 2020

(54) MOTION-BASED CAMERA MODE CONTROL TO REDUCE ROLLING SHUTTER ARTIFACTS

(71) Applicant: GoPro, Inc., San Mateo, CA (US)

(72) Inventors: Shishir Rao Ayalasomayajula, Cupertino, CA (US); Ravi Kumar Belagutti Shivanandappa, Santa Clara, CA (US); Anandhakumar Chinnaiyan, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,778

(22) Filed: May 15, 2019

(65) Prior Publication Data
US 2019/0356851 A1    Nov. 21, 2019

Related U.S. Application Data

(63) Continuation of application No. 16/043,627, filed on Jul. 24, 2018, now Pat. No. 10,306,145, which is a
(Continued)

(51) Int. Cl.
*H04N 5/232* (2006.01)
*H04N 5/357* (2011.01)
(Continued)

(52) U.S. Cl.
CPC .......... *H04N 5/23245* (2013.01); *G06T 7/20* (2013.01); *H04N 5/23216* (2013.01);
(Continued)

(58) Field of Classification Search
CPC ............... H04N 5/23245; H04N 5/783; H04N 5/23222; H04N 5/357; H04N 5/772;
(Continued)

(56) References Cited

U.S. PATENT DOCUMENTS 10,063,777 B2 * 8/2018 Rangam ............. H04N 5/23245
10,306,145 B2 * 5/2019 Ayalasomayajula ........................ H04N 5/23245
(Continued)

FOREIGN PATENT DOCUMENTS

CN    101790046 A    7/2010
CN    102326389 A    1/2012
(Continued)

OTHER PUBLICATIONS

PCT International Search Report and Written Opinion for PCT/US16/31076, dated Aug. 8, 2016, 19 Pages.
(Continued)

*Primary Examiner* — Nhan T Tran
(74) *Attorney, Agent, or Firm* — Young Basile Hanlon & MacFarlane, P.C.

(57) ABSTRACT

Cameras may monitor its operation and automatically switch between operation modes thereby to best capture users' experiences. Auxiliary sensor data collected by the one or more sensors and/or captured image data may be analyzed to determine when a camera should switch to a high-motion operation mode. The auxiliary sensor data include motion information of the camera and the content of the captured images include motion information of the captured objects. When a camera or objects captured by the camera are moving rapidly, the camera is switched to operate at the high-motion operation mode to ensure image quality and minimize artifacts to best capture users' experiences. Motion of the camera may be detected or predicted by analyzing the auxiliary sensor data and motion of the captured objects may be detected by analyzing the captured image data thereby to determine whether or not the camera should switch to the high-motion operation mode.

20 Claims, 6 Drawing Sheets

Related U.S. Application Data continuation of application No. 15/365,860, filed on Nov. 30, 2016, now Pat. No. 10,063,777, which is a continuation-in-part of application No. 15/142,943, filed on Apr. 29, 2016, now Pat. No. 10,063,776.

(60) Provisional application No. 62/155,882, filed on May 1, 2015.

(51) Int. Cl.

| | | |
|---|---|---|
| *G06T 7/20* | (2017.01) | |
| *H04N 5/77* | (2006.01) | |
| *H04N 5/783* | (2006.01) | |
| *H04N 9/82* | (2006.01) | |
| *H04N 5/343* | (2011.01) | |
| *H04N 5/353* | (2011.01) | |

(52) U.S. Cl.
CPC ..... *H04N 5/23222* (2013.01); *H04N 5/23248* (2013.01); *H04N 5/23254* (2013.01); *H04N 5/343* (2013.01); *H04N 5/353* (2013.01); *H04N 5/357* (2013.01); *H04N 5/772* (2013.01); *H04N 5/783* (2013.01); *H04N 9/8211* (2013.01)

(58) Field of Classification Search
CPC ............ H04N 5/23216; H04N 9/8211; H04N 5/23248; H04N 5/343; H04N 5/23254; H04N 5/353; G06T 7/20
See application file for complete search history.

(56) References Cited

U.S. PATENT DOCUMENTS

| | | | |
|---|---|---|---|
| 2005/0030387 A1 | 2/2005 | Pilu | |
| 2005/0285941 A1 | 12/2005 | Haigh | |
| 2006/0061666 A1* | 3/2006 | Kaneko | H04N 5/23245 348/222.1 |
| 2007/0104462 A1* | 5/2007 | Saito | H04N 19/503 386/329 |
| 2008/0149723 A1 | 6/2008 | Zhu | |
| 2009/0087016 A1* | 4/2009 | Berestov | G06K 9/00664 382/100 |
| 2009/0263021 A1* | 10/2009 | Takamori | G06K 9/00771 382/181 |
| 2009/0290641 A1* | 11/2009 | Crinon | H04N 19/56 375/240.16 |
| 2010/0182442 A1 | 7/2010 | Maeng | |
| 2010/0265344 A1 | 10/2010 | Velarde | |
| 2012/0057034 A1* | 3/2012 | Tanaka | H04N 5/23212 348/208.1 |
| 2013/0027581 A1* | 1/2013 | Price | H04N 5/2351 348/229.1 |
| 2013/0242120 A1 | 9/2013 | Venkatraman | |
| 2013/0286250 A1* | 10/2013 | Kumar | H04N 5/232 348/231.99 |
| 2013/0342714 A1* | 12/2013 | Zhou | H04N 5/23258 348/208.2 |

FOREIGN PATENT DOCUMENTS

| | | |
|---|---|---|
| CN | 102377730 A | 3/2012 |
| CN | 103650504 A | 3/2014 |
| CN | 103685935 A | 3/2014 |
| CN | 103957355 A | 7/2014 |
| WO | 2011150109 A1 | 12/2011 |
| WO | 2013138011 A3 | 9/2013 |

OTHER PUBLICATIONS

Supplementay European Search Report dated Mar. 15, 2018 for EP 1678984 (9 pages).
Chinese Office Action for Application No. CN201680025043.2, dated Jul. 31, 2019, 6 pages.
Chinese Office Action and Search Report for App No. CN201680025043.2, dated May 13, 2020, 11 pages.

* cited by examiner

MOTION-BASED CAMERA MODE CONTROL TO REDUCE ROLLING SHUTTER ARTIFACTS

CROSS-REFERENCE TO RELATED APPLICATION(S)

The application is a continuation of U.S. application Ser. No. 16/043,627, filed on Jul. 24, 2018, which is a continuation of U.S. application Ser. No. 15/365,860, filed on Nov. 30, 2016, which is a continuation-in-part application of U.S. application Ser. No. 15/142,943, filed on Apr. 29, 2016, which claims the benefit of Provisional Application No. 62/155,882, filed on May 1, 2015, both of which are incorporated herein by reference in their entirety.

BACKGROUND

Technical Field

This disclosure relates to a camera, and more specifically, to automatically controlling an operation mode of a camera.

Description of the Related Art

Most capture devices allow for a variety of options and configurations for capturing image, video, and audio content. For example, a capture device can be configured to capture a single image, a time-lapsed burst of multiple images, or video captured at varying frames per second (e.g., 24 frames per second (fps), 30 fps, 120 fps, 240 fps, etc.) In a conventional capture device, a user manually selects a specific operation mode for capturing content. For action cameras used during activities such as skiing, snowboarding, surfing, biking, etc., users often do not have direct access to the camera or are otherwise focused on the activities during the image or video capture. Users are often not in a position to switch camera operation modes at the right time to optimize capturing the experience.

In one representative example scenario, a skier has a camera mounted on his helmet to capture his ski runs. At different times, he or she makes jumps. The skier would like the camera to capture all his jumps without any distortion in image qualities as well as draining the camera's battery power, but the user is unable to manually switch the camera to the desired modes to captures his ski jumps during his ski runs. Thus, conventional camera systems fail to provide any mechanism for automatically determining and switching to an operation mode that best captures a user experience.

BRIEF DESCRIPTION OF THE DRAWINGS

The teachings of the present disclosure can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Cameras may monitor its operation and automatically switch between operation modes thereby to best capture users' experiences. Auxiliary sensor data collected by the one or more sensors and/or captured image data may be analyzed to determine when a camera should switch to a high-motion operation mode to better capture users' experience. The auxiliary sensor data include motion information of the camera and the content of the captured images include motion information of the captured objects. The motion information may be processed to determine a measure of motion of the camera or of the captured objects. Motion of the camera may be detected or predicted by analyzing the auxiliary sensor data and motion of the captured objects may be detected by analyzing the captured image data thereby to determine whether or not the camera should switch to the high-motion operation mode. When the determined measure of motion is above a threshold motion level indicating that the camera is or the objects captured are moving rapidly, the camera may switch to operate at the high-motion operation mode. A frame capture interval of a high-motion operation mode may be shorter than a frame capture interval of the low-motion operation mode. In addition, a ratio of the frame capture interval to the frame period of the high-motion operation mode may be shorter than that of the low-motion operation mode. The frame period of the high-motion operation mode may be the same as or shorter than that of the low-motion operation mode.

Example Camera Configuration

Figure 1:
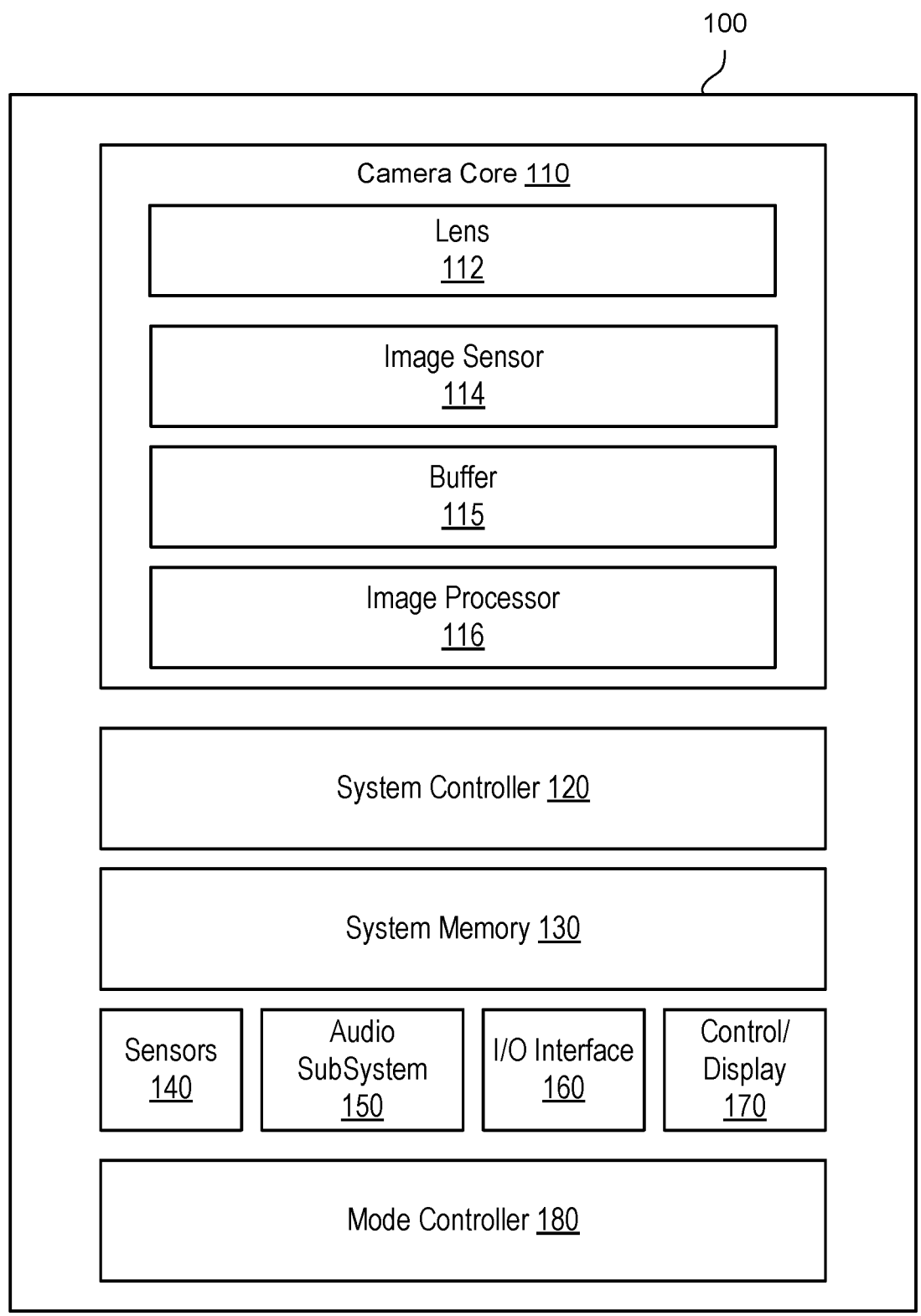
FIG. 1 is a block diagram illustrating a camera, according to one embodiment.

FIG. 1 is a block diagram illustrating a camera 100, according to one embodiment. In the illustrated embodiment, the camera 100 may comprise a camera core 110 comprising a lens 112, an image sensor 114, and an image processor 116. The camera 100 additionally may include a system controller 120 (e.g., a microcontroller or microprocessor) that controls the operation and functionality of the camera 130 and system memory 130 configured to store executable computer instructions that, when executed by the system controller 120 and/or the image processor 116, perform the camera functionalities described herein. In some embodiments, a camera 130 may include multiple camera cores 110 to capture fields of view in different directions which may then be stitched together to form a cohesive image. For example, in an embodiment of a spherical camera system, the camera 130 may include two camera cores 110 each having a hemispherical or hyperhemispherical lens that each captures a hemispherical or hyperhemispherical field of view which are stitched together in post-processing to form a spherical image. The lens 112 can be, for example, a wide angle lens, hemispherical, or hyperhemispherical lens that focuses light entering the lens to the image sensor 114 which captures images and/or video frames. The image sensor 114 may convert light incident upon the image sensor chip into electrical signals representative of the light incident upon the image sensor ("image data" hereinafter). Such a process is referred to as "capturing" image data, and capturing image data representative of an image is referred to as "capturing an image" or "capturing a frame". The image sensor 114 may include a Bayer color filter array that captures image data and outputs raw Bayer pattern data.

In different configurable operation modes, the image sensor 114 may capture high-definition images having a resolution of, for example, 3 Mp (megapixels), 5 Mp, 7 Mp, 8 Mp, 12 Mp, or higher or high-definition video having resolutions of 720p, 1080p, 4 k, or higher. In a burst image operation mode, the image sensor 114 may capture a burst of multiple images at frame rates of, for example, 3 fps (frames per second), 5 fps, 8 fps, 10 fps, 30 fps, 48 fps, 60 fps, 120 fps, or higher. The image sensor 114 may capture an image in a first interval of time and then wait a second interval of time before capturing another image (during which no image data is captured). In different configurable operation modes, the image sensor 114 may capture video frames at frame rates of, for example, 24 fps, 30 fps, 60 fps, 120 fps, 240 fps, or higher. The image sensor 114 may include a charge-coupled device ("CCD") image sensor, a complementary metal-oxide semiconductor ("CMOS") image sensor, or any other suitable image sensor configured to convert captured light incident upon the image sensor chip into image data.

The image processor 116 may encode the captured image data, for example, by performing one or more image processing functions of the captured image data. For instance, the image processor 116 may perform a Bayer transformation, demosaicing, noise reduction, image sharpening, image stabilization, rolling shutter artifact reduction, color space conversion, compression, or other in-camera processing functions. Processed image data may be temporarily or persistently stored to system memory 130 and/or to a non-volatile storage, which may be in the form of internal storage or an external memory card. In one embodiment, image data captured by the image sensor 114 is temporarily stored to a buffer 115. The image processor 116 may read the image data from the buffer 115 and may encode the captured image data.

Sensors 140 may capture various sensor data concurrently with, or independently of, image or video capture. The sensor data may be stored in association with the captured image or video data as metadata. For example, the sensors 140 may capture time-stamped location information based on a global positioning system (GPS) sensor, and/or an altimeter. Other sensors 140 may be used to detect and capture orientation of the camera 100 including, for example, an orientation sensor, an accelerometer, a gyroscope, or a magnetometer. Other sensors 140 may be used to detect and capture biometric information relating to a camera user or subject of the capture such as, for example, pulse data. Sensor data captured from the various sensors 140 may be processed to generate other types of metadata. For example, sensor data from the accelerometer may be used to generate motion metadata, comprising velocity and/or acceleration vectors representative of motion of the camera 100. Furthermore, sensor data from the orientation sensor may be used to generate orientation metadata describing the orientation of the camera 100. Sensor data from the GPS sensor may provide GPS coordinates identifying the location of the camera 100, and the altimeter measures the altitude of the camera 100. In one embodiment, the sensors 140 are rigidly coupled to the camera 100 such that any motion, orientation, or change in location experienced by the camera 100 is also experienced by the sensors 140. Alternatively, sensors 140 may be remote from the camera 100 and affixed to an object of interest that is a subject of the image or video capture (e.g., a bike, surfboard, vehicle, etc.). In an embodiment, the sensors 140 are integrated with a mobile device carried by the user that can communicate wirelessly with the camera 100 to provide the sensor data. In yet another embodiment, the sensors 140 are integrated with an aerial vehicle on which the camera 100 is mounted. The sensors 140 furthermore may associate a time stamp representing when the data was captured by each sensor. In one embodiment, the sensors 140 automatically begin collecting sensor data when the camera 100 begins capturing an image or recording a video.

An audio subsystem 150 may include, for example, one or more microphones and one or more audio processors to capture and process audio data correlated with video capture. In one embodiment, the audio subsystem 150 includes a microphone array having two or microphones arranged to obtain directional audio signals.

An input/output (I/O) interface 160 may transmit and receive data from various external devices. For example, the I/O interface 160 may facilitate the receiving or transmitting video or audio information through an I/O port. Examples of I/O ports or interfaces include USB ports, HDMI ports, Ethernet ports, audioports, and the like. Furthermore, embodiments of the I/O interface 160 may include wireless ports that can accommodate wireless connections. Examples of wireless ports include Bluetooth, Wireless USB, Near Field Communication (NFC), and the like. The I/O interface 160 may also include an interface to synchronize the camera 100 with other cameras or with other external devices, such as a remote control, a second camera, a smartphone, a client device, or a video server.

A control/display subsystem 170 may include various control and display components associated with operation of the camera 100 including, for example, LED lights, a display, buttons, microphones, speakers, and the like.

A mode controller 180 may control the camera 100 (and optionally one or more additional cameras) to automatically switch between operation modes for best capturing a user's experience. When operating in different operation modes, the camera 100 may generate images and/or videos having different properties. For example, the camera may capture images at different resolutions (e.g., 18 Mp (megapixel), 14 Mp, 12 Mp, 8 Mp, 7 Mp, 5 Mp, 3 Mp, etc.), or capture a series of images captured at different rates (e.g., 3 fps (frames per second), 5 fps, 8 fps, 10 fps, 20 fps, etc.). Furthermore, videos may be captured using different formats, frame rates (e.g., 240 fps (frames per second), 120 fps, 60 fps, 30 fps, etc.) and/or resolutions (e.g., 1080p, 730p, 4K, etc.) Other camera functions such as aperture, shutter speed, exposure level, color correction, rolling shutter correction, etc. may also be automatically controlled. In addition to other possible criteria, an embodiment of the mode controller 180 may switch a camera's operation modes, determine or select operational parameters of different operation modes, or turn on or off features based on a measure of motion detected by the camera 100 or detected in the captured scenes. For example, different motion measures may make it desirable for the camera to operate at different operation modes to ensure image quality, prevent artifacts, or introduce desired cinematic effects into the video.

Motion may be detected by analyzing the auxiliary sensor data, content of the captured images and audio, control inputs (e.g., button presses, voice commands, gesture commands, etc.) detected by the camera, predefined user preferences, camera state information (e.g., a current configuration of the camera), physical capabilities of the camera, or a combination of other data collected by the mode controller 180. In one embodiment, the mode controller 180 continuously analyzes the various types of input data to detect or to predict the motion of the camera. Then, a high-motion operation mode (e.g., a sparse mode as described with respect to FIG. 5 or a combination mode as described with respect to FIG. 6, etc.) that may be better suited for capturing high motion events is triggered. For example, the auxiliary sensor data and/or the content of the captured images and audio may include motion information indicating a measure of motion of the camera or of objects of the captured scene. The motion history may be used to predict future motion that is likely to take place and change the operation mode accordingly. For example, if the mode controller 180 detects a trend of increasing velocity, it may predict that the motion will continue to increase and switch to the high-motion operation mode. In another example, using location information, the mode controller 180 may predict when the camera is entering or has entered a geographic area of interest. In yet another example, the mode controller 180 analyzes biometric data from a user and changes a camera mode in response to detecting an increased pulse rate, which may be an indirect indicator of high motion. In a further example, the mode controller 180 may switch operation modes in response to a button press or control signal, either by itself or in combination with other inputs. As another further example, the sensor and content analytics module 202 may predict that the high-motion event is likely to take place with increasing altitude or as the user approaches a location of interest and may switch operation modes.

The mode controller 180 may switch the camera 100 to the high-motion operation mode from the low-motion operation mode if the detected motion is determined to exceed a threshold motion level. The mode controller 180 may be integrated with the camera 100 as illustrated or may be external to the camera 100. For example, the mode controller 180 may be integrated with an external mobile device or remote control that wireless communicates with the camera. In another embodiment, the mode controller 180 may be integrated with a mounting platform such as a handheld grip, a rotating mount, or an aerial vehicle that communicates with and controls operation of the camera 100. In one embodiment, the mode controller 180 (integrated with the camera 100 or external to the camera 100) may control operations of at least two or more cameras. Here, mode switching of multiple cameras may be coordinated in order to produce desired cinematic effects when the content is combined in post-processing.

The low-motion and high-motion operation modes (e.g., one or more operational parameters) and the criteria for switching between the operation modes may be pre-configured or selectable by the user. The mode controller 180 may determine one or more operational parameters of the low-motion or high-motion operation mode. Furthermore, if the mode controller 180 controls multiple cameras 100, the operation mode for each camera 100 at a given time may be different and the criteria for switching between camera modes in each camera 100 may be different. For example, a user may configure various predefined modes having different combinations of settings (e.g., resolution, frame rate, burst mode (e.g., the number of images captured within a second), etc.) that may be automatically switched between depending on the detected motion or other trigger parameters.

Figure 2:
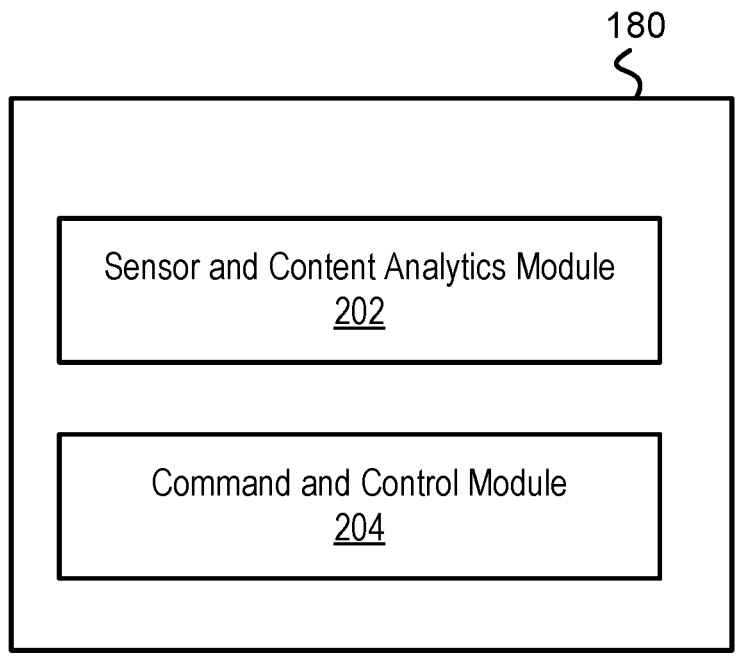
FIG. 2 is a block diagram illustrating a camera mode controller, according to one embodiment.

FIG. 2 is a block diagram illustrating a camera mode controller 180, according to one embodiment. The camera mode controller 180 may comprise a sensor and content analytics module 202, and a command and control module 204. The sensor and content analytics module 202 may analyze auxiliary data, image content, audio content, control inputs, or other input data and determine whether or not to switch to a high-motion operation mode for operating one or more cameras. The command and control module 204 may control operations of the one or more cameras 100 based on the operation mode determined by the sensor and content analytics module 202. For example, the command and control module 204 regulates operations of the image sensor 114, image processor 116, or other components of the camera 100 according to the operation modes determined by the sensor analytics module 202. More details of determining operation modes and regulating a camera's operation according to the determined operation modes are provided below with respect to FIGS. 3-5.

Camera Mode Control

Figure 3:
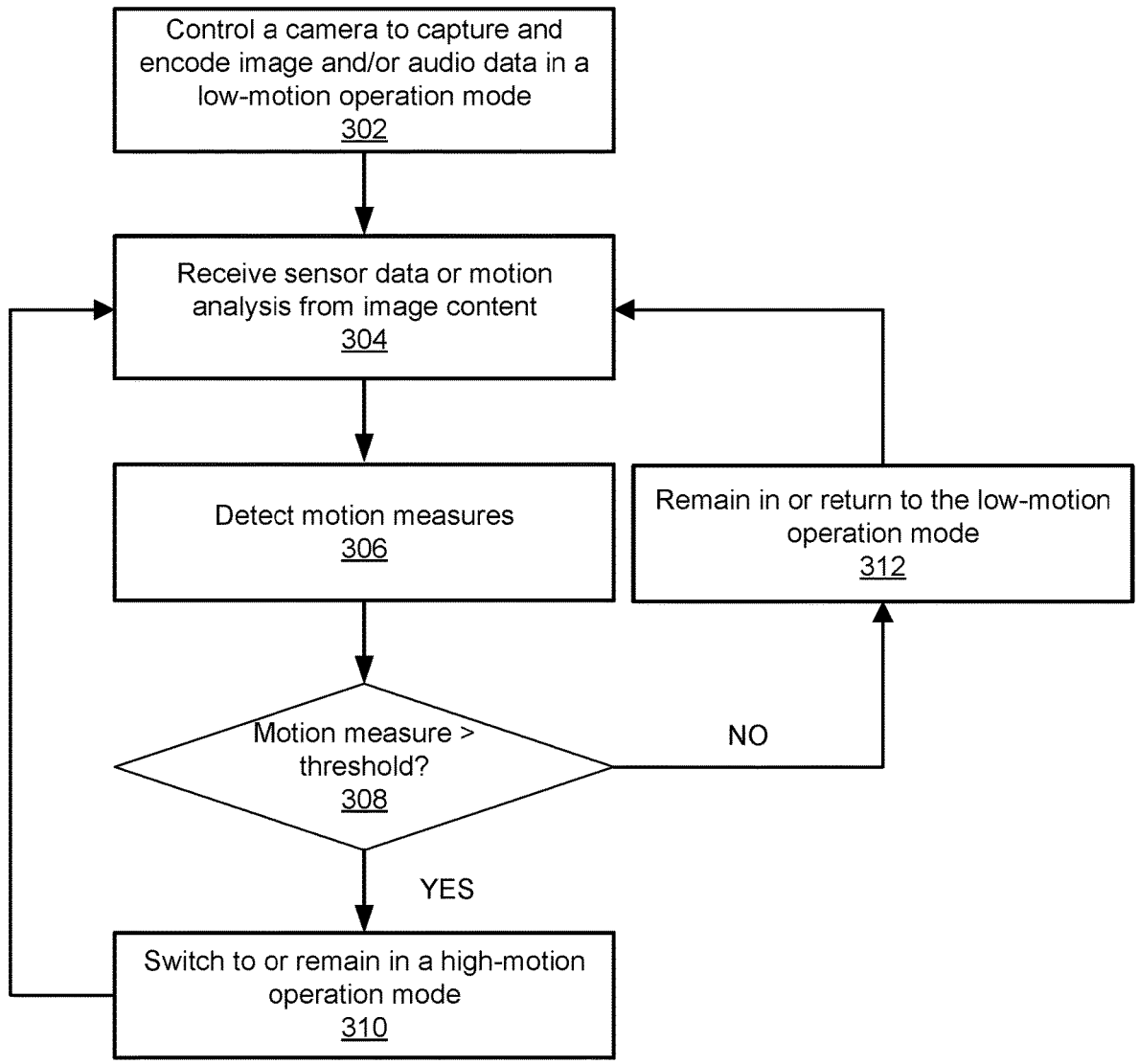
FIG. 3 is a flow chart illustrating a camera switching between operation modes based on auxiliary sensor data, according to one embodiment.

FIG. 3 is a flow chart illustrating an embodiment of a process for switching a camera between operation modes, according to one embodiment. A mode controller 180 may initially control a camera 100 to operate 302 in a low-motion operation mode in which images are captured and encoded according to the low-motion operation mode in which the image sensor 114 and the image processor 116 are configured in a mode best suited for low-motion capture. In one embodiment, the low-motion operation mode represents, for example, a standard frame rate operation mode (e.g., 30 frames per second) in which the image sensor 114 captures images at the standard frame rate, stores the frames to a buffer 115, and the image processor 116 reads the frames from the buffer 115 and encodes the frames at the standard frame rate. An example of a low-motion operation mode is described in further detail below with respect to FIG. 4.

The camera 100 may receive 304 input data, which may include sensor data from one or more sensors 140 (e.g., motion information, location information, biometric information, temperature, proximity to other cameras, etc.), the audio/visual data captured by the camera 100, one or more control inputs (e.g., a button press, voice command, gesture command, etc.), user preferences, camera state information (e.g., a current operation mode of the camera 100), physical capabilities of the camera, or a combination of these or other factors. The input data may also include motion analysis from the image content itself that indicates a motion level of the objects being captured.

The mode controller 180 (e.g., the sensor analytics module 202) may analyze the received input data to detect 306 a motion measure of the camera 100 or a motion measure of image content captured by the camera 100. For example, the sensor and content analytics module 202 uses angular velocity and orientation measured by a gyroscopic sensor to determine the orientation and/or rotation of the camera 100. The sensor and content analytics module 202 may also use acceleration and tilt measured by an accelerometer to determine a speed, acceleration, and/or orientation of the camera 100. The sensor and content analytics module 202 may further analyze the captured image content to determine a motion measure of the camera 100 relative to the captured object(s). The mode controller 180 may further determine a measure of motion for each type of different types of motions. For example, the mode controller may determine a degree of angular movement, a degree of linear movement, a degree of roll, pitch and yaw, and the like.

The sensor and content analytics module 202 compares 308 the determined or received motion measure to a threshold. For example, the sensor and content analytics module 202 compares the determined velocity to a threshold velocity or compares the determined acceleration to a threshold acceleration. One or more cameras' operation is controlled according to the comparison. In response to a determination that the motion measure is above a threshold, the command and control module 204 may generate 310 an output to control the camera 100 to switch to or remain in a high-motion operation mode, described in further detail below. In response to a determination that the motion measure is below a threshold, the command and control module 204 may generate an output to control operations of the camera 100 to remain in or return to 312 the low-motion operation mode.

Figure 4:
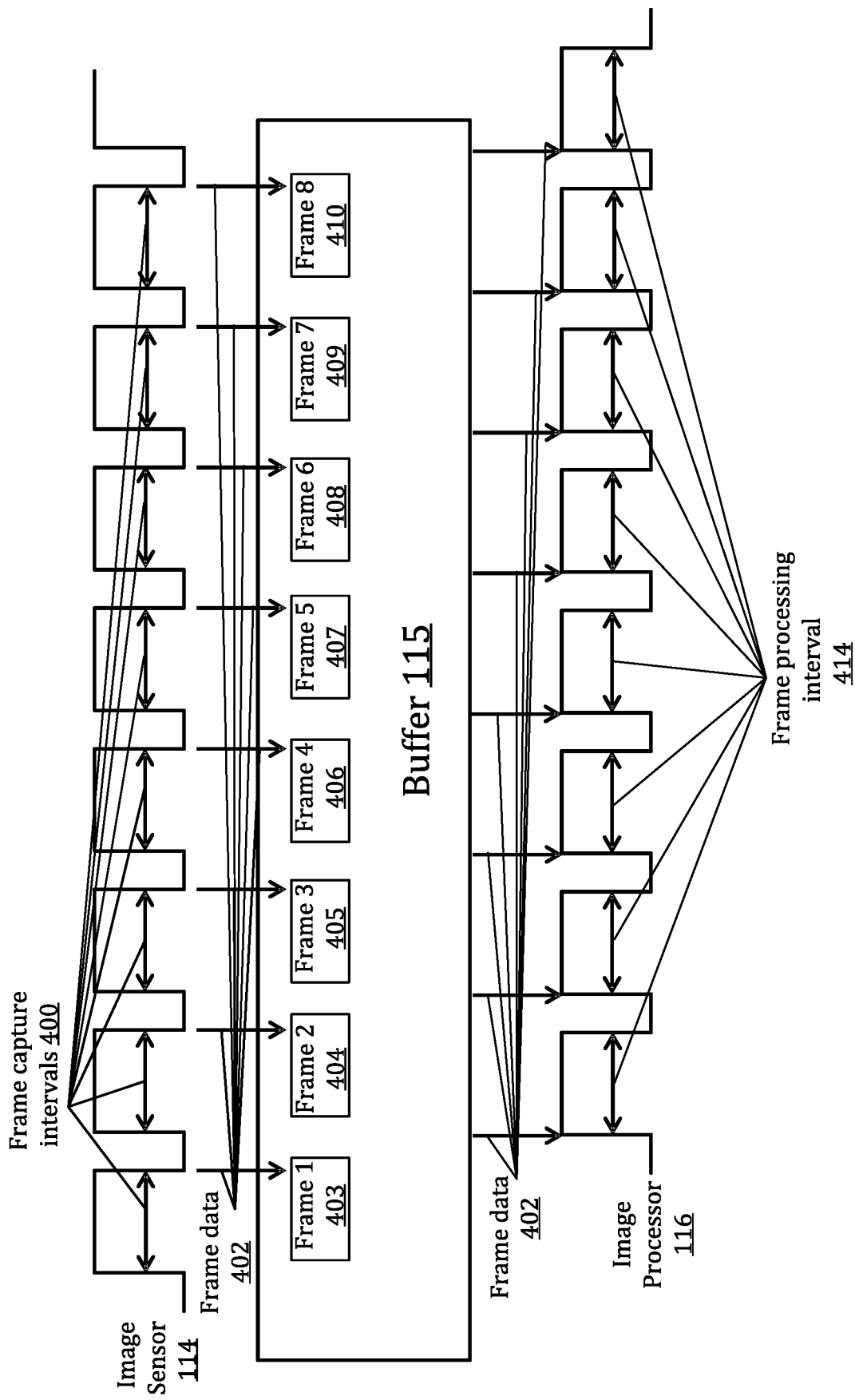
FIG. 4 illustrates data flow during image capture in a low-motion operation mode, according to one embodiment.

FIG. 4 illustrates an example data flow during image capture in a low-motion operation mode, according to one embodiment. In an embodiment, a relatively low frame rate may be used in the low-motion operation mode, such as, for example, 30 frames per second. The image sensor 114 is configured to capture a frame over a frame capture interval of time (e.g., frame capture intervals 400). The frame capture interval 400 may be shorter than the frame period. However, in low-motion scenarios, a relatively long frame capture interval 400 may be desirable. As referred herein, a frame period refers to a time period between a first time point when the image sensor begins to capture a first frame and a second time when the image sensor beings to capture a second frame adjacent to the first frame. As referred herein, a frame capture interval refers to a time period between a first time point when an image sensor begins to capture a frame and a second time point when the image sensor ends capturing the frame. The image sensor 114 writes captured frame data 402 to a buffer 115. For example, frame data 402 associated with frames is written to the buffer 115. The image processor 116 may be configured to read frame data 402 associated with the captured frames from the buffer 115. The image processor 115 processes the frame data 402 read from the buffer 115 in a frame processing interval (e.g., frame processing intervals 414). The frame processing interval 414 may also be less than the frame period to enable the camera to capture and process frames in substantially real-time.

Figure 5:
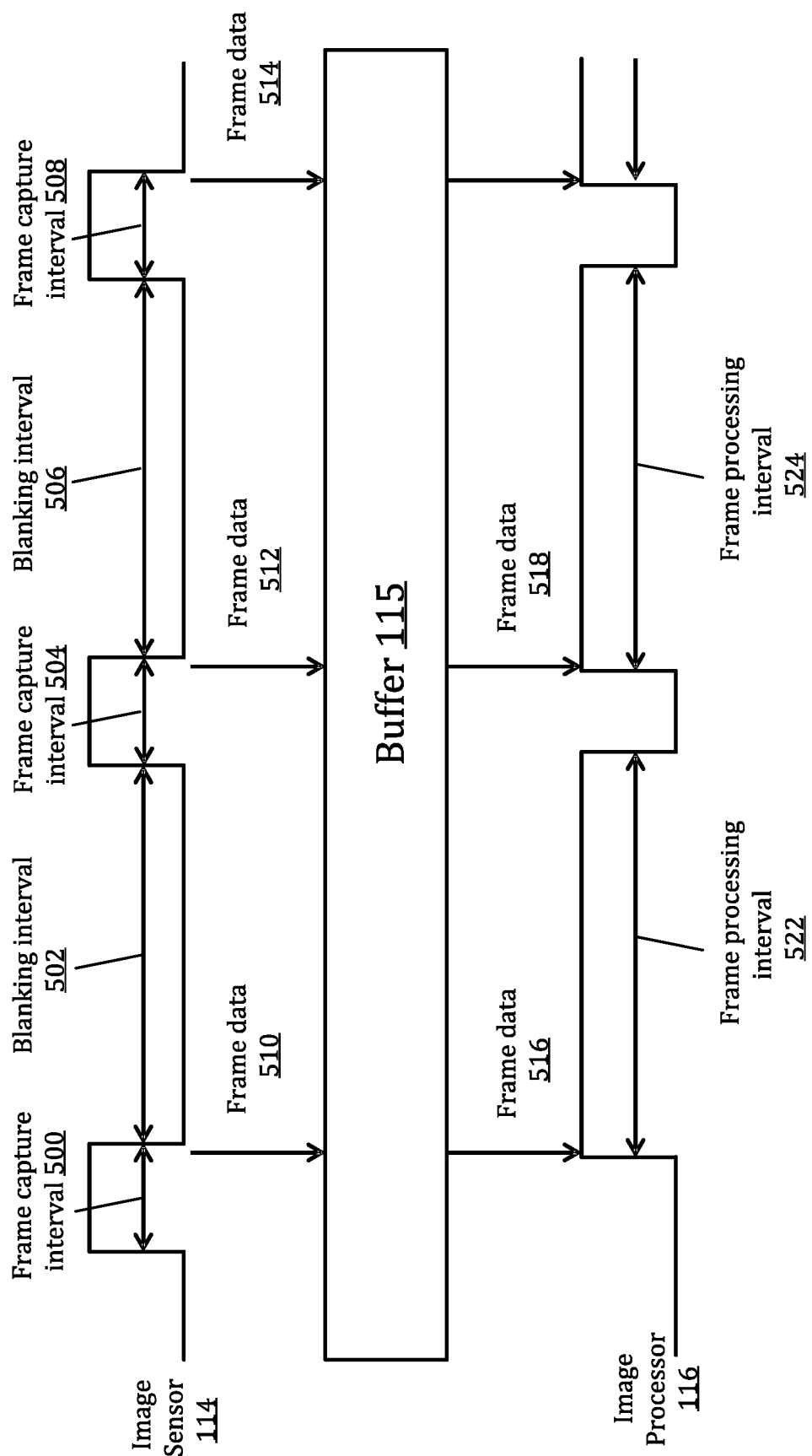
FIG. 5 illustrates data flow during image capture in a sparse mode, according to one embodiment.
Figure 6:
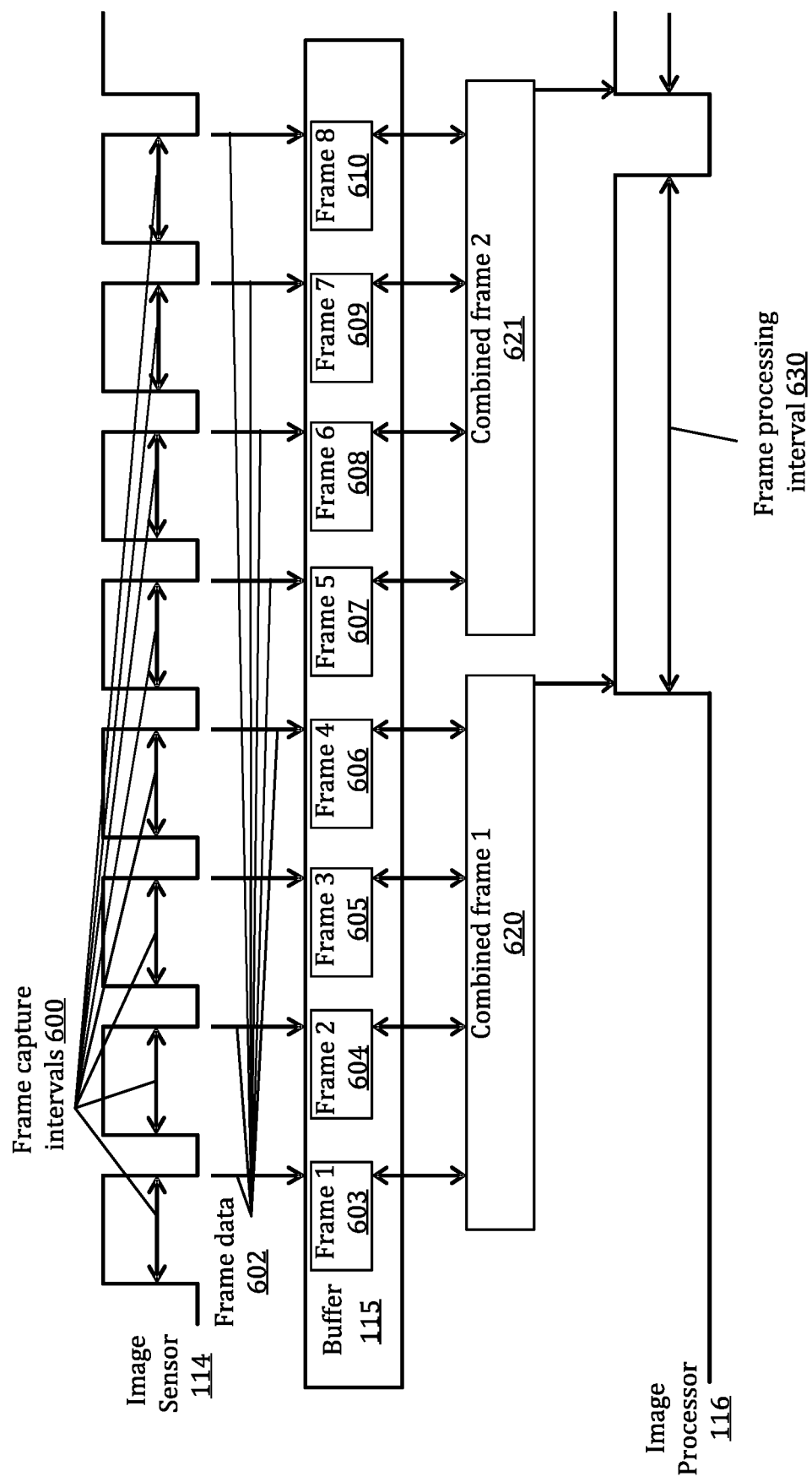
FIG. 6 illustrates data flow during image capture in a combination mode, according to one embodiment.

FIGS. 5 and 6 illustrate different examples of data flows during image capture in different high motion operation modes. If operating in the low-motion operation mode, high motions of a camera or of objects captured by the camera may cause image artifacts in captured images. When operating in a high-motion operation mode, it is desirable for the camera 100 to reduce these image artifacts. As described further below, one type of the image artifact is referred herein as "rolling shutter artifacts." "Rolling shutter artifacts" may appear in images captured by cameras that use "rolling shutter" methods. That is, when an object moves during the frame capture interval (or when the camera moves during the same), the captured reproduction of the object may be a slanted or swizzled version of the object, skewed relative to the motion between the object and the camera over the total frame capture interval. Rolling shutter artifacts are undesirable due to the distortion they impose on the object within a captured image.

In various embodiments, when operating in the high-motion operation mode, the camera 100 regulates capturing and/or processing frames to substantially minimize "rolling shutter artifacts." For example, the frame capture interval, a time interval between the time points of adjacent frames being captured, a subset of captured frames of which the frame data is processed, and/or a number of captured frames that are combined before being processed can be regulated when operating in the high-motion operation mode. The frame rate and/or image resolutions may also be regulated when switching the camera's 100 operation from the low-motion operation mode to the high-motion operation mode. One example high-motion operation mode is a "sparse mode" as referred herein and further described with respect to FIG. 5. Another example high-motion operation mode is a "combination mode" as referred herein and further described with respect to FIG. 6. A frame capture interval of a high-motion operation mode is shorter than a frame capture interval of the low-motion operation mode. In addition, a ratio of the frame capture interval to the frame period of the high-motion operation mode is shorter than that of the low-motion operation mode. The frame period of the high-motion operation mode may be the same as or shorter than that of the low-motion operation mode.

In some embodiments, the motion controller 180 may configure the camera 100 to switch to operate according to the sparse mode (or the combination mode) when the motion measure is above a first threshold and to switch to operate according to the combination mode (or the sparse mode) when the motion measure is above a second threshold. In some situations (e.g., a certain motion level, a certain type of motion, etc.), the camera 100 may capture better images when operating in sparse mode than when operating in combination mode or vice versa. The motion controller 180 may configure the camera 100 to operate in the spare mode (or combination mode) in response to detection of those situations. For example, the motion controller 180 may configure the camera 100 to switch to operate according to the sparse mode (or the combination mode) when the motion measure of a first type of motion is above a threshold motion and to switch to operate according to the combination mode (or the sparse mode) when the motion measure of a second type of motion is above a threshold motion.

FIG. 5 illustrates data flow during image capture in a sparse mode, according to one embodiment. The image sensor 114 is configured to capture a frame over a frame capture interval of time (e.g., frame capture intervals 500, 504, 508) and to pause capturing image data between frame capture intervals without capturing frame data during blanking intervals (e.g., blanking intervals 502, 506). In some embodiments, the image sensor 114 is exposed to light during the frame capture interval and is shielded from light during the blanking interval. The operation of the camera 100 in the sparse mode may beneficially allows for 1) the capture of frames within a short enough frame capture interval that rolling shutter artifacts are substantially minimized, while 2) capturing frames at a slow enough effective frame rate that the image processor 116 can process the captured frames at a frame processing rate that minimizes the power or resource requirements of the image processor 116.

The mode controller 180 may determine one or more operational parameters (e.g., the frame capture interval, frame processing interval, blanking interval) of the sparse mode. The mode controller 180 may determine an operation parameter based on the determined motion measure, pre-configured settings, and/or user inputs.

In some embodiments, the mode controller 180 may determine a frame capture interval based on the determined motion measure. The mode controller 180 may select the frame capture interval such that rolling shutter artifacts are substantially minimized when capturing frames. The mode controller 180 regulates a frame capture interval of a sparse mode to be shorter than a frame capture interval of a low-motion operation mode. As such, one frame is captured in a shorter time interval in a sparse mode in comparison to the low-motion operation mode. For example, the frame capture interval 500 (504 or 508) is shorter than the frame capture interval 400 of a low-motion capture mode illustrated in FIG. 4. The frame capture interval may be inversely correlated to the motion measure. For example, the greater the motion measure is, the shorter the frame capture interval is. In some embodiments, the mode controller 180 may determine the frame capture interval for a sparse mode according to a predetermined setting. For example, when a motion measure is above a threshold motion, a frame capture interval of 833 milliseconds is selected. As another example, when a motion measure is above a first threshold motion but below a second threshold motion, a frame capture interval of 833 milliseconds is selected, and when a motion measure is above the second threshold motion, a frame capture interval of 417 milliseconds is selected.

In some embodiments, the mode controller 180 may determine a frame processing interval based on capabilities and settings of the camera 100, such as, a rate that the image processor 116 can process frame data of captured frames. Under different settings that may be predetermined or user configured, the camera 100 may capture frames at different resolutions. The mode controller 180 may configure the image sensor 114 to capture images at a higher resolution when switching to a high-motion operation mode from a low-motion operation mode. The mode controller 180 selects frame processing intervals based on the configuration or capabilities of the image processor 116. For example, if the image processor 116 can encode frames at a first resolution at 60 fps, and can encode frames at a second, higher resolution at 30 fps, a frame processing interval of 17 milliseconds or less can be selected when processing frame data at the first resolution, and a frame processing interval of 33 milliseconds or less can be selected when processing frame data at the second resolution.

The mode controller 180 may determine a blanking interval based on the determined frame capture interval and the frame processing interval. The mode controller 180 may select the blanking interval such that the sum of the frame capture interval and the blanking interval is no less than the frame processing interval. In some embodiments, the blanking interval is longer than the frame capture interval, for instance by a factor of 2 or 3 or more, and in other embodiments, the blanking interval is shorter than the frame capture interval, for instance by a factor of 1.5, 2, or more. In some embodiments, the frame capture interval and the blanking interval may be approximately the same length. The determined frame capture interval and blanking interval together determine the frame capture rate (i.e., a rate of the image sensor 114 capturing frames) of the sparse mode. For a camera 100, the frame capture rate of the sparse mode may be the same as, higher than, or lower than the standard frame rate of a low-motion capture mode. It should be noted that in these embodiments and others, the image sensor 114 can be configured to capture frames over a frame capture interval consistent with a first frame rate higher than the standard frame rate, but can incorporate a blanking interval between frame captures, resulting in an effective second frame rate slower than the first frame rate.

During a frame capture interval, the image sensor 114 captures a frame, creates and provides frame data to the buffer 115. As illustrated, during the frame capture interval 500 (504 or 508), the image sensor 114 generates and provides frame data 510 (512 or 514) to the buffer 115. The image processor 116 encodes the frame data in the buffer 115. As illustrated, frame data 516 (or 518) is provided to the image processor 116 from the buffer 115 at the beginning of the frame processing interval 522 (or 514). The mode controller 118 may regulate the frame capture intervals and/or the frame processing intervals. That is, the mode controller 118 may regulate the time point and the time duration that the image sensor 114 captures frame data and that the image processor 116 encodes frame data.

The image processor 116 receives (or reads) frame data stored in the buffer 115 associated with a captured frame, and encodes the frame data during a frame processing interval (e.g., a frame processing interval 522 or 524). For a camera 100, a frame processing interval (e.g., a frame processing interval 522) of a sparse mode may be the same as, higher than, or lower than a frame processing interval of a low-motion operation mode (e.g., a frame processing interval 414 of FIG. 4.) The image processor 116 is configured to perform any image or frame processing operations during the frame processing interval. The image processor 116 encodes the frame data into a renderable or displayable image, for instance in the JPEG format or any other suitable format. In some embodiments, the frame processing interval is substantially longer than the frame capture interval, for instance by a factor of ×1.5, ×2, ×3, ×4, or more.

In examples of videos, the image processor 116 encodes the frame data as if the frame data were captured at a slower frame rate or over a longer frame capture interval than the image sensor captured the frame data. For instance, if the frame capture interval in which a frame is captured corresponds to a frame rate of 120 fps (a frame capture interval of 0.00833 seconds followed by a blanking interval of 0.0250 seconds), the image processor 116 can process the resulting frame data such that the frame data is encoded into video over a frame processing interval corresponding to a frame rate 30 fps (a frame processing interval of 0.0333 seconds). The image processor 116 can output the processed frame data to a module or memory external to the camera 100, or can store the processed frame data in an internal memory.

In some embodiments, a sparse mode can be implemented with a small or substantially zero-length blanking interval. For example, the image sensor 114 can capture frames at a frame capture rate with minimal blanking. In these embodiments, the image sensor 114 can be configured to provide only a subset of captured frames to the buffer 115. For instance, the image sensor 114 may provide only every 4th frame to the buffer 115, and the image processor 116 can be configured to read and process the provided frames as illustrated in FIG. 5. Alternatively, the image sensor 114 can be configured to provide every captured frame to the buffer 115, and the image processor 116 can be configured to read from the buffer 115 only a subset of the frames. For instance, the image processor 116 can be configured to read and process only every 3rd frame from the buffer 115, and the unread frames can be subsequently deleted or overwritten with new frames from the image sensor 116.

FIG. 6 illustrates data flow during image capture in a combination mode, according to one embodiment. The image sensor 114 is configured to capture a frame over a frame capture interval of time (e.g., frame capture intervals 600). As noted above, the mode controller 180 may determine a frame capture interval such that rolling shutter artifacts are substantially minimized when capturing frames. For a camera 100, the determined frame capture interval (e.g., a frame capture interval 600) of a combination mode may be shorter than or the same as the frame interval (e.g., a frame capture interval 400 illustrated in FIG. 4) of a low-motion operation mode. The image sensor 114 writes captured frame data 602 to a buffer 115. For example, frame data 602 associated with frames is written to the buffer 115.

The image processor 116 may combine the captured frames into combined frames and process the combined frames. For example, frame 1 through 4 603 through 606 are combined into a combined frame 1 620. The mode controller 180 may configure the image processor 116 to combine the captured frames into combined frames. The mode controller 180 may determine a number of frames that are combined into a combined frame. The mode controller 180 may determine a frame processing interval, similar to determining a frame processing interval as previously described with respect to FIG. 5. Based on the determined frame capture interval and frame processing interval, the mode controller 180 may determine a number of frames to be combined. For a camera 100, a frame processing interval (e.g., a frame processing interval 630) of a combination mode may be the same, higher than, or lower than a frame processing interval of a low-motion operation mode (e.g., a frame processing interval 414 of FIG. 4.)

Although a particular embodiment of an image processor 116 combining the frames is illustrated, in practice, the image processor 116 can combine the frames in a number of ways. For instance, instead of combining 4 frames, the mode controller 180 can combine all or portions of any number of frames (e.g., 2 frames, 3 frames, 5 frames, or more.) In some embodiments, the image processor 116 combines a predetermined number of frames into a combined frame. The image processor 116 may combine any number of frames into a combined frame such that the number of frames being combined into combined frames may vary, for example, based on a setting selected by a user of the camera 100 or based on a motion level. Further, although the primary description of the combination mode herein focuses on the embodiment of FIG. 6, other embodiments of operation in a combination mode are described below.

The image processor 116 can be configured to combine frames by any suitable method. The image processor 116 may combine corresponding pixels in each frame, for instance by digitally summing the information of each corresponding pixel in each frame. Alternatively, the image processor 116 can combine corresponding pixels by averaging the pixel information (such as the luminance or chrominance information) for each of the corresponding pixels, by averaging only similar pixels (corresponding pixels above a threshold measure of similarity), by denoising pixels determined to represent a stationary part of a frame, and the like. Combining each set of corresponding pixels results in a combined frame, with each pixel of the combined frame representing a combination of the corresponding pixels in each of the frames. In some embodiments, pattern noise reduction, defective pixel correction, or any other image repair or calibration process can be implemented by the frame processor on received frames either before or during combination.

Combining frames into a combined frame prior to being encoded beneficially reduce the processing resource and power requirements of the image processor 116 by reducing the total number of frames processed by the image processor 116. For instance, in the embodiment of FIG. 6, combining every four frames into a combined frame reduces the number of frames processed by the image processor 116 by 75%. This beneficially allows the image processor 116 to process frames at a first rate (e.g., 30 frames per second) while the image sensor 114 captures frames at a second rate (e.g., 120 frames per second), reducing the processing load of the image processor 116 while increasing the amount of image information available to the image processor 116 by increasing the number of captured frames (and the amount of frame data) captured by the image sensor 114. By increasing the amount of frame data available to the image processor 116 for processing, the dynamic range and/or signal-to-noise ratio of image data processed by the image processor 116 can be improved. Further, various image effects can be incorporated into the processed image data as a result of the increase in frame data, such as a simulated capture angle or weighted motion blur. The processed image data captured in a combination mode can beneficially improve image quality while reducing the effect of rolling shutter artifacts.

The image processor 116 processes the combined frame over a frame processing interval. For example, the image processor 116 receives the combined frame 1 and processes the combined frame 1 during the frame processing interval 630 to produce a processed frame. The image processor 116 then outputs the processed frame to a module or memory external to the camera 100, or can store the processed data in an internal memory. The image processor 116 temporally transcodes the combined frames into video renderable or displayable at a slower frame rate than the frame capture rate.

As illustrated, the image processor 116 combines the frames from the buffer 115. In some embodiments, the mode controller 180 may configure the image sensor 114 to combine the frames and write combined frames to the buffer and the image processor 116 reads the combined frames from the buffer 115. The mode controller 180 may combine the frames sequentially as they are received. In some embodiments, frames may be compressed, for example, by an image capture accelerator or other component prior to being stored in the buffer 115. The compressed frame data can be decompressed prior to being combined by the image processor 116, or the image processor 116 can combine the compressed frame data (for instance by summing or averaging wavelet coefficients).

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A method for controlling operation of a camera, comprising:
    determining a motion of the camera based on received sensor data;
    configuring the camera to operate in a low frame rate mode responsive to the motion of the camera being below a first threshold;
    configuring the camera to operate in a medium frame rate mode responsive to the motion of the camera being above the first threshold and being below a second threshold; and
    configuring the camera to operate in a high frame rate mode responsive to the motion of the camera being above the second threshold.

2. The method of claim 1, further comprising:
    comparing the motion of the camera to the first threshold and to the second threshold.

3. The method of claim 1, wherein the low frame rate mode is a low-motion operation mode, the medium frame rate mode is a first high-motion operation mode, and the high frame rate mode is a second high-motion operation mode.

4. The method of claim 3, wherein in the low-motion operation mode, the camera captures a first image by an image sensor of the camera during a first frame capture interval comprising a first percentage of a first frame period.

5. The method of claim 4, wherein in the first high-motion operation mode, the camera captures a second image by the image sensor during a second frame capture interval comprising a second percentage of a second frame period, the second frame capture interval being shorter than the first frame capture interval and the second percentage of the second frame period being shorter than the first percentage of the first frame period.

6. The method of claim 5, wherein in the second high-motion operation mode, the camera captures a third image by the image sensor during a third frame capture interval comprising a third percentage of a third frame period, the third frame capture interval being shorter than the second frame capture interval and the third percentage of the third frame period being shorter than the second percentage of the second frame period.

7. The method of claim 5, wherein in the first high-motion operation mode, the camera prevents light from reaching the image sensor during a blanking interval following the second frame capture interval, and an image processor of the camera reads the captured second image from a buffer of the camera and encodes the captured second image during a frame processing interval, and wherein a sum of the second frame capture interval and the blanking interval is at least the frame processing interval.

8. The method of claim 7, further comprising:
    determining the second frame capture interval based on the motion of the camera;
    selecting the frame processing interval based on capabilities of the camera; and
    determining the blanking interval such that the sum of the second frame capture interval and the blanking interval is at least the frame processing interval.

9. The method of claim 7, further comprising:
    selecting the second frame capture interval and the blanking interval according to a predetermined setting.

10. The method of claim 7, wherein the second frame capture interval is shorter than the blanking interval by a factor of 2 or more.

11. The method of claim 7, wherein in the first high-motion operation mode, the image sensor captures a plurality of images over a plurality of second frame capture intervals, and an image processor of the camera reads the plurality of images from a buffer of the camera, combines the plurality of images into a combined image, and encodes the combined image during a frame processing interval.

12. The method of claim 11, further comprising:
    determining the second frame capture interval based on the motion of the camera;
    selecting the frame processing interval based on capabilities of the camera; and
    determining the blanking interval such that the sum of the second frame capture interval and the blanking interval is at least the frame processing interval.

13. The method of claim 11, further comprising:
    selecting the second frame capture interval and the blanking interval according to a predetermined setting.

14. The method of claim 5, wherein the second frame capture interval is selected based on a predetermined time interval associated with reduced rolling shutter artifacts.

15. The method of claim 5, wherein:
    in the first high-motion operation mode, the image sensor captures the second image during the second frame capture interval and captures no images during a blanking interval, and an image processor of the camera reads the second image from a buffer of the camera and encodes the second image during a first frame processing interval; and in the second high-motion operation mode, the image sensor captures a plurality of images during a plurality of third frame capture intervals and the image processor reads a plurality of frames from the buffer, combines the plurality of frames into a combined frame, and encodes the combined frame during a second frame processing interval.

16. A camera comprising:
an image sensor; and
a mode controller configured to:
configure the camera to operate in a low frame rate mode responsive to a motion of the camera being below a first threshold;
configure the camera to operate in a medium frame rate mode responsive to the motion of the camera being above the first threshold and being below a second threshold; and
configure the camera to operate in a high frame rate mode responsive to the motion of the camera being above the second threshold.

17. The camera of claim 16, further comprising:
one or more sensors configured to generate sensor data, the one or more sensors including a gyroscope and an accelerometer, the sensor data including any of motion information, location information, biometric information, temperature, and proximity to other cameras.

18. The camera of claim 17, wherein the mode controller is further configured to:
determine the motion of the camera based on the sensor data.

19. The camera of claim 18, wherein to determine the motion of the camera based on the sensor data comprises:
determining an orientation and a rotation of the camera based on angular velocity and orientation data measured by the gyroscope;
determining a speed, an acceleration, and the orientation of the camera based on tilt and acceleration data measured by the accelerometer; and
determining a measure of motion for each type of motion, the measure of motion including at least one of a degree of angular movement, a degree of linear movement, a degree of roll, a degree of pitch, and a degree of yaw.

20. A system comprising a non-transitory computer-readable storage medium including stored instructions, that when executed by a processor, causes the processor to:
configure a camera to operate in a low frame rate mode responsive to a motion of the camera being below a first threshold;
configure the camera to operate in a medium frame rate mode responsive to the motion of the camera being above the first threshold and being below a second threshold; and
configure the camera to operate in a high frame rate mode responsive to the motion of the camera being above the second threshold.

\* \* \* \* \*